(12) United States Patent
Park et al.

(10) Patent No.: US 11,557,763 B2
(45) Date of Patent: Jan. 17, 2023

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Byung Chun Park, Daejeon (KR); Ji Hye Kim, Daejeon (KR); Jung Min Han, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 273 days.

(21) Appl. No.: 16/644,379

(22) PCT Filed: Jan. 2, 2019

(86) PCT No.: PCT/KR2019/000043
§ 371 (c)(1),
(2) Date: Mar. 4, 2020

(87) PCT Pub. No.: WO2019/143047
PCT Pub. Date: Jul. 25, 2019

(65) Prior Publication Data
US 2020/0381719 A1    Dec. 3, 2020

(30) Foreign Application Priority Data
Jan. 19, 2018 (KR) ......................... 10-2018-0007302

(51) Int. Cl.
*H01M 4/525* (2010.01)
*H01M 4/505* (2010.01)
*H01M 10/0525* (2010.01)
*H01M 4/02* (2006.01)

(52) U.S. Cl.
CPC ............ *H01M 4/525* (2013.01); *H01M 4/505* (2013.01); *H01M 10/0525* (2013.01); *H01M 2004/028* (2013.01)

(58) Field of Classification Search
CPC ....... H01M 10/0525; H01M 2004/028; H01M 4/366; H01M 4/38; H01M 4/386; H01M 4/505; H01M 4/525
See application file for complete search history.

(56) References Cited

U.S. PATENT DOCUMENTS

| | | |
|---|---|---|
| 2012/0034516 A1 | 2/2012 | Koo et al. |
| 2013/0017442 A1 | 1/2013 | Cha et al. |
| 2014/0027670 A1 | 1/2014 | Sun et al. |
| 2014/0034872 A1 | 2/2014 | Watanabe et al. |
| 2014/0087262 A1 | 3/2014 | Imahashi et al. |
| 2014/0131616 A1 | 5/2014 | Sun et al. |
| 2014/0356713 A1 | 12/2014 | Sun et al. |
| 2016/0049649 A1 | 2/2016 | Noh et al. |
| 2016/0149210 A1 | 5/2016 | Yoo et al. |
| 2016/0260965 A1 | 9/2016 | Wu et al. |
| 2016/0293951 A1 | 10/2016 | Lim et al. |
| 2016/0359165 A1 | 12/2016 | Kim et al. |
| 2017/0301916 A1* | 10/2017 | Shin ................. C01B 25/45 |
| 2018/0047974 A1 | 2/2018 | Jo et al. |
| 2018/0241040 A1 | 8/2018 | You et al. |
| 2018/0241073 A1 | 8/2018 | You et al. |
| 2018/0287135 A1 | 10/2018 | Shin et al. |

FOREIGN PATENT DOCUMENTS

| | | |
|---|---|---|
| CN | 103354958 A | 10/2013 |
| CN | 105680031 A | 6/2016 |
| CN | 105993090 A | 10/2016 |
| JP | 2009146739 A | 7/2009 |
| JP | 2011023335 A | 2/2011 |
| KR | 20070077700 A | 7/2007 |
| KR | 100759751 B1 | 10/2007 |

(Continued)

OTHER PUBLICATIONS

Extended European Search Report including Written Opinion for Application No. EP19741246.3, dated Oct. 5, 2020, pp. 1-6.
Yang-Kook Sun et al, Effect of Mn Content in Surface on the Electrochemical Properties of Core-Shell Structured Cathode Materials, Journal of the Electrochemical Society, Published Decembers, 2011, pp. A1-A5, vol. 159, No. 1, XP055476917.
International Search Report for Application No. PCT/KR2019/000043 dated Apr. 17, 2019, 2 pages.
Search Report dated Jul. 27, 2022 from the Office Action for Chinese Application No. 201980004030.0 dated Aug. 16, 2022, 2 pages.

*Primary Examiner* — Carlos Barcena
(74) *Attorney, Agent, or Firm* — Lerner, David, Littenberg, Krumholz & Mentlik, LLP

(57) ABSTRACT

A positive electrode active material includes a center portion including a first lithium transition metal oxide with an average composition represented by Formula 1, $$Li_{1+a1}(Ni_{b1}Co_{c1}Mn_{d1}Al_{e1}M^1_{f1})O_2 \quad \text{[Formula 1]}$$

wherein, in Formula 1, $-0.1 \le a1 \le 0.2$, $0.8 \le b1 < 1.0$, $0 < c1 \le 0.2$, $0 < d1 \le 0.1$, $0 < e1 \le 0.05$, $0 \le f1 \le 0.05$, $b1/c1 \le 25$, and $b1/d1 \ge 20$, and $M^1$ includes at least one selected from the group consisting of Mg, Ti, Zr, Nb, and W, and a surface portion including a second lithium transition metal oxide with an average composition represented by Formula 2, $$Li_{1+a2}(Ni_{b2}Co_{c2}Mn_{d2}Al_{e2}M^1_{f2})O_2 \quad \text{[Formula 2]}$$

wherein, in Formula 2, $-0.1 \le a2 \le 0.2$, $0.6 \le b2 \le 0.95$, $0 \le c2 \le 0.2$, $0 \le d2 \le 0.1$, $0 \le e2 \le 0.05$, $0 \le f2 \le 0.05$, $b2/c2 \le 13$, and $b2/d2 \ge 3$, and $M^1$ includes at least one selected from the group consisting of Mg, Ti, Zr, Nb, and W.

17 Claims, No Drawings

(56) References Cited

FOREIGN PATENT DOCUMENTS

| KR | 101056714 B1 | 8/2011 |
| KR | 20120079801 A | 7/2012 |
| KR | 20130009499 A | 1/2013 |
| KR | 20140008408 A | 1/2014 |
| KR | 20140016314 A | 2/2014 |
| KR | 101644684 B1 | 8/2016 |
| KR | 101661395 B1 | 9/2016 |
| KR | 20170046066 A | 4/2017 |
| KR | 20170046921 A | 5/2017 |
| KR | 20170063146 A | 6/2017 |
| KR | 20170063395 A | 6/2017 |
| KR | 20170081799 A | 7/2017 |
| WO | 2007129812 A1 | 11/2007 |

\* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2019/000043, filed Jan. 2, 2019, which claims priority to Korean Patent Application No. 10-2018-0007302, filed Jan. 19, 2018, the disclosures of which are incorporated herein by reference.

TECHNICAL FIELD

The present invention relates to a positive electrode active material for a lithium secondary battery, a method of preparing the positive electrode active material, and a positive electrode active material for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide' or 'NCA-based lithium composite transition metal oxide') in which a portion of nickel (Ni) is substituted with cobalt (Co) or manganese (Mn)/aluminum (Al), has been developed. However, since capacity characteristics of conventionally developed NCM-based/NCA-based lithium composite transition metal oxides are insufficient, the NCM-based/NCA-based lithium composite transition metal oxides have been limited in application.

In order to address such limitation, studies have recently been made to increase a nickel (Ni) content in the NCM-based/NCA-based lithium oxides. However, with respect to a high-Ni NCM-based/NCA-based lithium oxide, since an oxidation number of nickel (Ni) tends to remain at 2+, there is a difficulty in finely controlling sintering conditions, such as sintering temperature and sintering atmosphere, in order to form nickel (Ni) having an initial oxidation number of 3+. Also, since crystals grow rapidly during sintering as the content of nickel (Ni) increases, it is difficult to control a crystal size and structural stability and chemical stability of the positive electrode active material are reduced, and thus, there is a limit in improving battery capacity and life characteristics.

DISCLOSURE OF THE INVENTION

Technical Problem

An aspect of the present invention provides a positive electrode active material in which efficiency and lifetime are improved by including nickel in an amount of 60 mol % or more based on a total number of moles of transition metals excluding lithium, but controlling ratios of Ni to other transition metals.

Another aspect of the present invention provides a method of preparing the positive electrode active material.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material which includes a center portion including a first lithium transition metal oxide with an average composition represented by the following Formula 1; and a surface portion including a second lithium transition metal oxide with an average composition represented by the following Formula 2.

$$Li_{1+a1}(Ni_{b1}Co_{c1}Mn_{d1}Al_{e1}M^1_{f1})O_2 \quad \text{[Formula 1]}$$

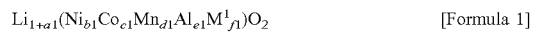

In Formula 1, $-0.1 \leq a1 \leq 0.2$, $0.8 \leq b1 \leq 1.0$, $0 \leq c1 \leq 0.2$, $0 \leq d1 \leq 0.1$, $0 \leq e1 \leq 0.05$, $0 \leq f1 \leq 0.05$, $b1/c1 \leq 25$, and $b1/d1 \geq 20$, and $M^1$ includes at least one selected from the group consisting of magnesium (Mg), titanium (Ti), zirconium (Zr), niobium (Nb), and tungsten (W).

$$Li_{1+a2}(Ni_{b2}Co_{c2}Mn_{d2}Al_{e2}M^1_{f2})O_2 \quad \text{[Formula 2]}$$

In Formula 2, $-0.1 \leq a2 \leq 0.2$, $0.6 \leq b2 \leq 0.95$, $0 \leq c2 \leq 0.2$, $0 \leq d2 \leq 0.1$, $0 < e2 \leq 0.05$, $0 \leq f2 \leq 0.05$, $b2/c2 < 13$, and $b2/d2 \leq 3$, and $M^1$ includes at least one selected from the group consisting of Mg, Ti, Zr, Nb, and W.

According to another aspect of the present invention, there is provided a method of preparing a positive electrode active material which includes: preparing a positive electrode active material precursor which includes nickel, cobalt, manganese, and aluminum, but has different compositions of a center portion and a surface portion; and mixing the positive electrode active material precursor and a lithium source and sintering the mixture to form a lithium transition metal oxide, wherein the lithium transition metal oxide includes a center portion with an average composition represented by Formula 1; and a surface portion with an average composition represented by Formula 2.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, a positive electrode active material having high capacity and excellent stability may be provided by preparing the positive electrode active material containing a high-Ni content in which an amount of nickel is 60 mol % or more based on a total number of moles of transition metals excluding lithium, but preparing a surface portion and a center portion of the positive electrode active material to have different ratios from each other.

In addition, a positive electrode active material having high output characteristics may be provided by controlling a ratio of the transition metal included in the positive electrode active material within a specific range.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material of the present invention includes a high-Ni-containing lithium transition metal oxide in which an amount of nickel is 60 mol % or more based on a total number of moles of the lithium transition metal oxide, and, specifically, a quaternary positive electrode active material essentially including four components of nickel (Ni), cobalt (Co), manganese (Mn), and aluminum (Al) is provided.

Particularly, in a case in which the quaternary positive electrode active material is included as in the present invention, stability of the positive electrode active material may be improved, life characteristics may be improved without degrading output characteristics and capacity characteristics in comparison to a positive electrode active material which includes a NCM-based compound containing nickel, cobalt, and manganese or a NCA-based compound containing nickel, cobalt, and aluminum, and excellent safety may be secured.

Specifically, the positive electrode active material according to the present invention includes a center portion including a first lithium transition metal oxide with an average composition represented by the following Formula 1; and a surface portion including a second lithium transition metal oxide with an average composition represented by the following Formula 2.

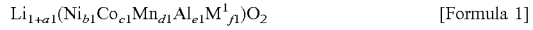

$\text{Li}_{1+a1}(\text{Ni}_{b1}\text{Co}_{c1}\text{Mn}_{d1}\text{Al}_{e1}\text{M}^1_{f1})\text{O}_2$ [Formula 1]

In Formula 1, $-0.1 \leq a1 \leq 0.2$, $0.8 \leq b1 < 1.0$, $0 < c1 \leq 0.2$, $0 < d1 \leq 0.1$, $0 < e1 \leq 0.05$, $0 \leq f1 \leq 0.05$, $b1/c1 \leq 25$, and $b1/d1 \geq 20$, for example, $0.85 \leq b1 < 1.0$, $0 < c1 \leq 0.15$, $0 < d1 \leq 0.05$, $0 < e1 \leq 0.03$, $0 \leq f1 \leq 0.02$, $b1/c1 \leq 23$, and $b1/d1 \geq 25$, and $M^1$ includes at least one selected from the group consisting of magnesium (Mg), titanium (Ti), zirconium (Zr), niobium (Nb), and tungsten (W).

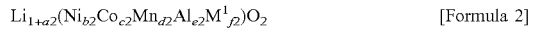

$\text{Li}_{1+a2}(\text{Ni}_{b2}\text{Co}_{c2}\text{Mn}_{d2}\text{Al}_{e2}\text{M}^1_{f2})\text{O}_2$ [Formula 2]

In Formula 2, $-0.1 \leq a2 \leq 0.2$, $0.6 \leq b2 \leq 0.95$, $0 < c2 \leq 0.3$, $0 < d2 \leq 0.1$, $0 < e2 \leq 0.05$, $0 \leq f2 \leq 0.05$, $b2/c2 < 13$, and $b2/d2 \geq 3$, for example, $0.65 \leq b2 \leq 0.8$, $0.1 \leq c1 \leq 0.3$, $0 < d2 \leq 0.05$, $0.01 \leq e2 \leq 0.05$, $0 \leq f2 \leq 0.02$, $b2/c2 \leq 12$, and $b2/d2 \geq 3$, and $M^1$ includes at least one selected from the group consisting of Mg, Ti, Zr, Nb, and W.

Particularly, as described above, the positive electrode active material of the present invention may further improve the output characteristics and the capacity characteristics by controlling amounts of the transition metal oxides included in the positive electrode active material within specific ranges.

Specifically, a Ni/Co ratio may be 18 or less, preferably 15 or less, and more preferably 5 to 15 throughout a positive electrode active material particle. Also, a Ni/Mn ratio may be 8 or more, preferably 15 or more, more preferably 20 or more, and most preferably 15 to 60 throughout the positive electrode active material particle. Since the amounts of the transition metal oxides included in the positive electrode active material particle are controlled within the above ranges, formation of NiO may be suppressed even if nickel is included in a large amount of 60 mol % or more throughout the particle and intercalation and/or deintercalation of lithium ions may be facilitated, and thus, the output characteristics may be improved when the positive electrode active material is used in a battery.

Also, preferably, the Ni/Co ratio and/or the Ni/Mn ratio of the positive electrode active material may vary depending on the center portion and the surface portion of the positive electrode active material particle.

For example, the Ni/Co ratio of the center portion of the positive electrode active material may be 25 or less, preferably 23 or less, more preferably 20 or less, and most preferably 5 to 20, and the Ni/Mn ratio of the center portion of the positive electrode active material may be 20 or more, preferably 25 or more, more preferably 30 or more, and most preferably 30 to 60.

For example, the Ni/Co ratio of the surface portion of the positive electrode active material may be less than 13, preferably 12 or less, and more preferably 5 or less, and the Ni/Mn ratio of the surface portion of the positive electrode active material may be 3 or more, preferably 3.5 or more, preferably 10 or more, preferably 20 or more, more preferably 30 or more, and most preferably 30 to 50.

Since the amounts of the transition metal oxides included in the center portion and the surface portion of the positive electrode active material particle are controlled within the above ranges, the formation of NiO may be suppressed even if nickel is included in a large amount of 60 mol % or more throughout the particle and the intercalation and/or deintercalation of the lithium ions may be facilitated, and thus, the output characteristics may be improved when the positive electrode active material is used in a battery.

Furthermore, since the positive electrode active material of the present invention not only essentially includes the four components of nickel, cobalt, manganese, and aluminum, but also includes a large amount of the nickel in the center portion of the particle and a relatively smaller amount of the nickel in the surface portion than the center portion, high capacity may be obtained and structural stability may be improved at the same time, and thus, a side reaction with an electrolyte solution may be reduced.

The positive electrode active material has the center portion, a region corresponding to 50 vol % to 95 vol %, for example, 70 vol % to 90 vol % of a total volume of the particle from the center of the particle, and the surface portion located on an outer surface of the center portion. In a case in which the center portion and the surface portion are included within the above range, a positive electrode active material having improved surface stability as well as high capacity may be prepared.

The positive electrode active material may have a core-shell structure in which compositions of the surface portion and center portion of the particle are different from each other or may have a concentration gradient structure in which the compositions of the surface portion and center portion of the particle are not only different from each other, but also a concentration of at least one metallic element included in the positive electrode active material is gradually changed from the center of the particle to a surface thereof.

For example, in a case in which the positive electrode active material has the concentration gradient structure, the concentration of the nickel included in the positive electrode active material may be decreased while the nickel has a concentration gradient that gradually changes from the center of the positive electrode active material particle to the surface thereof. In this case, a concentration gradient slope of the nickel may be constant from the center of the positive electrode active material particle to the surface thereof. In a case in which the nickel has the concentration gradient in which a high concentration of the nickel is maintained in the center portion of the particle and the concentration gradually decreases toward the surface portion of the particle as described above, since the structural stability is improved while exhibiting the high capacity characteristics, the deterioration of thermal stability may be prevented.

Also, the concentration of the manganese included in the positive electrode active material may be increased while the manganese has a concentration gradient that gradually changes from the center of the active material particle to the surface thereof, and, in this case, a concentration gradient slope of the manganese may be constant from the center of the positive electrode active material particle to the surface thereof. Thus, in a case in which the manganese has the concentration gradient in which a low concentration of the manganese is maintained in the center portion in the active material particle and the concentration gradually increases toward the surface portion, excellent thermal stability may be obtained without decreasing the capacity.

The concentration of the cobalt included in the positive electrode active material may be increased while the cobalt has a concentration gradient that gradually changes from the center of the active material particle to the surface thereof, and, in this case, a concentration gradient slope of the cobalt may be constant from the center of the positive electrode active material particle to the surface thereof. Thus, in a case in which the cobalt has the concentration gradient in which a low concentration of the cobalt is maintained in the center portion in the active material particle and the concentration gradually increases toward the surface portion, excellent output characteristics may be obtained without decreasing the capacity and an amount of lithium by-products present on the surface may be small.

The concentration of the aluminum included in the positive electrode active material may be increased while the aluminum has a concentration gradient that gradually changes from the center of the active material particle to the surface thereof, and, in this case, a concentration gradient slope of the aluminum may be constant from the center of the positive electrode active material particle to the surface thereof. Thus, in a case in which the aluminum has the concentration gradient in which a low concentration of the aluminum is maintained in the center portion in the active material particle and the concentration gradually increases toward the surface portion, excellent thermal stability may be obtained.

In the present invention, the expression "metal has a gradually changing concentration gradient" denotes that the metal has a concentration distribution in which the concentration of the metal is continuously gradually changed across the entire particle or in a specific region.

In a case in which the positive electrode active material further includes the concentration gradient structure as described above, since the metal has a concentration gradient in which the concentration of the metal is gradually changed depending on a position in the positive electrode active material particle, an abrupt phase boundary region is not present from the center to the surface, and thus, its crystal structure is stabilized and thermal stability is increased. Also, in a case in which the concentration gradient slope of the metal is constant, the effect of improvement in the structural stability may be further improved, and, since the concentration of each metal in the active material particle is changed by the concentration gradient, the effect of the positive electrode active material on the improvement of battery performance may be further improved by easily using properties of the corresponding metal.

Thus, in the case that the positive electrode active material further includes the concentration gradient structure, high capacity, long lifetime, and thermal stability may be obtained when the positive electrode active material is used in a secondary battery and performance degradation at high voltage may be minimized at the same time.

The positive electrode active material may further include a coating layer which includes at least one selected from the group consisting of boron (B), silicon (Si), tungsten (W), and niobium (Nb). For example, in a case in which the coating layer further includes at least one selected from the group consisting of B and W, the amount of the lithium by-products present on the surface of the positive electrode active material may be reduced by the coating layer. Accordingly, since the occurrence of a side reaction is suppressed by blocking a contact between the positive electrode active material and the electrolyte solution included in the lithium secondary battery, an effect of improving life characteristics may be achieved when the positive electrode active material is used in the battery.

The coating layer may be formed across an entire surface of the positive electrode active material and may be partially formed. Specifically, in a case in which the coating layer is partially formed on the surface of the positive electrode active material, the coating layer may be formed in an area of 20% or more to less than 100% of a total surface area of the positive electrode active material.

The amount of the lithium by-products present on the surface of the positive electrode active material may be in a range of 0.2 part by weight to 0.8 part by weight, for example, less than 0.5 part by weight based on 100 parts by weight of the positive electrode active material. The lithium by-products, for example, may include LiOH or $Li_2CO_3$, and, in a case in which the amount of the lithium by-products present on the surface of the positive electrode active material satisfies the above range, since the side reaction with the electrolyte solution is reduced when the positive electrode active material is used in a battery, the degradation of the life characteristics may be prevented.

Also, the present invention provides a method of preparing a positive electrode active material which includes the steps of: preparing a positive electrode active material precursor which includes nickel, cobalt, manganese, and aluminum, but has different compositions of a center portion and a surface portion; and mixing the positive electrode active material precursor and a lithium source and sintering the mixture to form a lithium transition metal oxide, wherein the lithium transition metal oxide includes a center portion with an average composition represented by Formula 1; and a surface portion with an average composition represented by Formula 2.

Hereinafter, the method of preparing a positive electrode active material of the present invention will be described in more detail.

First, a positive electrode active material precursor, which includes nickel, cobalt, manganese, and aluminum, but has different compositions of a center portion and a surface portion, is prepared (Step 1).

In the preparing of the positive electrode active material precursor, for example, a first transition metal-containing solution containing nickel, cobalt, manganese, and aluminum and a second transition metal-containing solution containing nickel, cobalt, manganese, and aluminum in concentrations different from those of the first transition metal-containing solution are prepared. Subsequently, the first transition metal-containing solution and the second transition metal-containing solution are mixed to allow a mixing ratio of the first transition metal-containing solution to the second transition metal-containing solution to be gradually changed from 100 vol %:0 vol % to 0 vol %:100 vol %, and, simultaneously, an ammonium cation-containing solution and a basic aqueous solution are added so that a positive electrode active material precursor having a concentration gradient in which the concentration of at least one of the nickel, cobalt, manganese, and aluminum is gradually changed from the center of the particle to the surface thereof.

Also, a core-shell structured positive electrode active material precursor having a center portion composed of a first transition metal solution and a surface portion composed of a second transition metal solution may be prepared by adding the first transition metal solution, an ammonium cation-containing solution, and a basic aqueous solution to form the center portion, and subsequently adding the second transition metal solution, a ammonium cation-containing solution, and a basic aqueous solution to form the surface portion.

The ammonium cation-containing solution may include at least one selected from the group consisting of $NH_4OH$, $(NH_4)_2SO_4$, $NH_4NO_3$, $NH_4Cl$, $CH_3COONH_4$, and $NH_4CO_3$. In this case, water or a mixture of water and an organic solvent (specifically, alcohol etc.), which may be uniformly mixed with the water, may be used as a solvent.

The basic aqueous solution may include at least one selected from the group consisting of NaOH, KOH, and $Ca(OH)_2$, and water or a mixture of water and an organic solvent (specifically, alcohol etc.), which may be uniformly mixed with the water, may be used as a solvent.

In this case, the amounts of the transition metal oxides included in the positive electrode active material may be controlled within specific ranges by controlling molar ratios of transition metals included in the first transition metal solution and/or the second transition metal solution.

A positive electrode active material precursor having a center portion with an average composition represented by the following Formula 3 and a surface portion with an average composition represented by the following Formula 4 may be prepared.

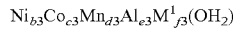  [Formula 3]

In Formula 3, $0.8 \leq b3 < 1.0$, $0 \leq c3 \leq 0.2$, $0 \leq d3 \leq 0.1$, $0 \leq e3 \leq 0.05$, and $0 \leq f3 \leq 0.05$, and $M^1$ includes at least one selected from the group consisting of Mg, Ti, Zr, Nb, and W.

  [Formula 4]

In Formula 4, $0.6 \leq b4 \leq 0.95$, $0 \leq c4 \leq 0.2$, $0 \leq d4 \leq 0.1$, $0 \leq e4 \leq 0.05$, and $0 \leq f4 \leq 0.05$, and $M^1$ includes at least one selected from the group consisting of Mg, Ti, Zr, Nb, and W.

Subsequently, the positive electrode active material precursor and a lithium source are mixed and sintered to prepare a lithium transition metal oxide (Step 2).

The lithium source is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

An amount of the lithium source used may be determined according to amounts of lithium and metal in the finally prepared positive electrode active material, and, specifically, the lithium source may be used in an amount such that a molar ratio (molar ratio of lithium/metallic element) of lithium included in the lithium source to the transition metal element included in the positive electrode active material precursor is 0.9 or more, for example, 1.0 to 1.20.

The sintering may be performed in a temperature range of 700° C. to 950° C., preferably 700° C. to 900° C., and more preferably 750° C. to 900° C. Since the sintering is performed in the above temperature range, high crystallinity may be obtained while the concentration gradient of the nickel is maintained, and thus, a positive electrode active material having improved structural stability may be prepared.

Also, the method may further include a step of washing the lithium transition metal oxide with a solution with a pH of 9 to 11 at a temperature of −10° C. to 15° C. and drying the washed lithium transition metal oxide in an inert atmosphere, specifically, an $N_2$ atmosphere in which 02 and/or $CO_2$ are removed, an Ar atmosphere, or a vacuum atmosphere. Dissolution of lithium in a positive electrode active material crystal structure may be prevented and the lithium by-products present on the surface of the positive electrode active material may be effectively removed by the washing and drying process.

After the washing, the method may further include performing a heat treatment in an oxygen atmosphere at 500° C. to 750° C. In a case in which the heat treatment is further performed under the above conditions, surface recrystallization is induced so that an effect of suppressing regeneration of the lithium by-products on the surface of the positive electrode active material may be achieved.

Furthermore, the method may further include a step of forming a coating layer which includes at least one selected from the group consisting of B, Si, W, and Nb.

Specifically, any method may be used as a method of forming the coating layer on the positive electrode active material without particular limitation as long as it is a method of forming a coating layer on a surface of an active material, and, for example, after the positive electrode active material is surface-treated with a composition, which is prepared by dispersing the coating element in a solvent, using a conventional slurry coating method such as coating, dipping, and spraying, the coating layer may be formed on the surface of the positive electrode active material by performing a heat treatment.

As the solvent capable of dispersing the metal for the formation of the coating layer, at least one mixture selected from the group consisting of water, alcohol having 1 to 8 carbon atoms, dimethyl sulfoxide (DMSO), N-methylpyrrolidone, acetone, and a combination thereof may be used.

The solvent for the formation of the coating layer may exhibit appropriate applicability, and may be included in an amount such that it is easily removed during the subsequent heat treatment.

Also, the heat treatment for the formation of the coating layer may be performed in a temperature range in which the solvent included in the composition may be removed, and may specifically be performed in a temperature range of 150° C. to 500° C., for example, 250° C. to 450° C. In a case in which the heat treatment temperature is less than 150° C., there is a concern that a side reaction caused by the residual solvent and the resulting degradation of battery characteristics may occur, and, in a case in which the heat treatment temperature is greater than 500° C., there is a concern that a side reaction caused by high-temperature heat may occur.

Also, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector may include a metal with high conductivity, wherein the positive electrode collector is not particularly limited as long as it is easily bonded to the positive electrode active material layer, but is not reactive in a voltage range of the battery. For example, stainless steel, aluminum, nickel, titanium, fired carbon, or aluminum or stainless steel that is surface-treated with one of carbon, nickel, titanium, silver, or the like may be used as the positive electrode collector. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a conductive agent, a binder, and a dispersant, if necessary, in addition to the above positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive tubes such as carbon nanotubes; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, polymethylmethacrylate, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers thereof, and any one thereof or a mixture of two or more thereof may be used. The binder may be included in an amount of 0.1 wt % to 15 wt % based on the total weight of the positive electrode active material layer.

The dispersant may include an aqueous dispersant or an organic dispersant such as N-methyl-2-pyrrolidone.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder, the conductive agent, and the dispersant, if necessary, in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), dimethyl formamide (DMF), acetone, or water, and any one thereof or a mixture of two or more thereof may be used. An amount of the solvent used may be sufficient if the solvent may dissolve or disperse the positive electrode active material, the conductive agent, the binder, and the dispersant in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte.

Since the lithium secondary battery includes the above-prepared positive electrode active material, the lithium secondary battery may be a secondary battery having improved charge and discharge efficiency in which the charge and discharge efficiency is 90% or more, for example, 90% to 96% when the secondary battery is charged at 4.25 V at 0.1 C to 0.005 C in a constant current (CC)-constant voltage (CV) charge mode at 25° C., and discharged at 0.1 C to 2.5 V, and the charge and discharge efficiency is 95% or more, for example, 95% to 100% when the secondary battery is discharged at a CV for 5 hours after the secondary battery is charged at 4.25 V at 0.1 C to 0.005 C in a CC-CV charge mode at 25° C. and discharged at a CC of 0.1 C to 2.5 V.

Since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC) diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, an anion of the lithium salt may include at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Examples of the medium and large sized device may be an electric vehicle, a hybrid electric vehicle, a plug-in hybrid electric vehicle, and a power storage system, but the present invention is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Nickel sulfate, cobalt sulfate, manganese sulfate, and aluminum nitrate were mixed in distilled water in amounts such that a molar ratio of nickel:cobalt:manganese:aluminum was 92:5:2:1 to prepare a first transition metal-containing solution with a concentration of 2M.

Also, nickel sulfate, cobalt sulfate, manganese sulfate, and aluminum nitrate were mixed in distilled water in amounts such that a molar ratio of nickel:cobalt:manganese:aluminum was 70:23:2:5 to prepare a second transition metal-containing solution with a concentration of 2M.

A container containing the first transition metal-containing solution and a container containing the second transition metal-containing solution were respectively connected to a 4 L batch-type reactor set at 60° C. In addition, a 4M NaOH solution and a 12% NH₄OH aqueous solution were prepared and connected to the batch-type reactor, respectively. 2.5 L of deionized water was put in the reactor, the reactor was then purged with nitrogen gas at a rate of 1 L/min to remove dissolved oxygen in the water, and a non-oxidizing atmosphere was created in the reactor.

Thereafter, the first transition metal-containing solution and the second transition metal-containing solution were mixed while changing a ratio of the first transition metal-containing solution and the second transition metal-containing solution from 100 vol %:0 vol % to 0 vol %:100 vol % and being continuously added to the reactor at a rate of 180 mL/min. Also, the NaOH aqueous solution and the NH$_4$OH aqueous solution were respectively added at rates of 180 mL/min and 40 mL/min and subjected to a co-precipitation reaction for 24 hours to precipitate particles of a transition metal hydroxide. The precipitated particles of the transition metal hydroxide were separated, washed, and then dried in an oven at 115° C. for 12 hours to prepare a precursor for a positive electrode active material with a concentration gradient gradually changing from the center of the particle to the surface thereof in which an average composition of a center portion was Ni$_{0.92}$Co$_{0.05}$Mn$_{0.02}$Al$_{0.01}$ (OH)$_2$, and an average composition of a surface portion was Ni$_{0.70}$Co$_{0.23}$Mn$_{0.02}$Al$_{0.05}$ (OH)$_2$.

The above-prepared positive electrode active material precursor and LiOH were mixed so that a molar ratio of lithium (Li):metal (Me) was 1.07:1, and the mixture was sintered at 820° C. for 10 hours in an oxygen atmosphere. Subsequently, the sintered particles were washed with an aqueous solution at 10° C. for 30 minutes. In this case, a positive electrode active material with a total average composition of the particle of LiNi$_{0.86}$Co$_{0.10}$Mn$_{0.02}$Al$_{0.02}$O$_2$ was prepared.

[Positive Electrode Preparation]

The above-prepared positive electrode active material, a carbon black conductive agent, and a polyvinylidene fluoride binder were mixed in a weight ratio of 95:2.5:2.5 in an N-methylpyrrolidone (NMP) solvent to prepare a composition for forming a positive electrode. A 20 μm thick aluminum foil was coated with the composition for forming a positive electrode, dried at 115° C. for 2 hours, and then roll-pressed to prepare a positive electrode.

[Secondary Battery Preparation]

After the above-prepared positive electrode and a lithium thin film, as a negative electrode, were stacked with a polyethylene separator to prepare a coin-type battery by a conventional method, an electrolyte solution, in which 1 M LiPF$_6$ was dissolved in a mixed solvent in which ethylene carbonate and diethyl carbonate were mixed in a ratio of 30:70, was injected to prepare a lithium secondary battery.

Example 2

The first transition metal-containing solution and second transition metal-containing solution prepared in Example 1 were used. Specifically, a container containing the first transition metal-containing solution and a container containing the second transition metal-containing solution were connected to a batch-type reactor. In addition, a 4M NaOH solution and a 12% NH$_4$OH aqueous solution were prepared and connected to the batch-type reactor, respectively. 2.5 L of deionized water was put in the reactor, the reactor was then purged with nitrogen gas at a rate of 1 L/min to remove dissolved oxygen in the water, and a non-oxidizing atmosphere was created in the reactor.

Thereafter, the first transition metal-containing solution, the NaOH solution, and the NH$_4$OH aqueous solution were respectively added at rates of 180 mL/min, 180 mL/min, and 20 mL/min to the reactor and reacted for 18 hours to form a center portion of a positive electrode active material.

Subsequently, the second transition metal-containing solution, the NaOH solution, and the NH$_4$OH aqueous solution were respectively added at rates of 180 mL/min, 180 mL/min, and 20 mL/min to the reactor and reacted for 6 hours to form a positive electrode active material with a total average composition of LiNi$_{0.86}$Co$_{0.1}$Mn$_{0.02}$Al$_{0.02}$O$_2$ in which a volume of the center portion was 75% and a volume of a surface portion was 25%.

The positive electrode active material, a positive electrode, and a lithium secondary battery including the positive electrode were prepared in the same manner as in Example 1 except that the above-prepared precursor was used.

Example 3

A positive electrode and a lithium secondary battery including the same were prepared in the same manner as in Example 1 except that, after the positive electrode active material prepared in Example 1 was washed in an aqueous solution at 10° C. for 30 minutes, boric acid was added in an amount of 0.25 wt % based on 100 parts by weight of the positive electrode active material, a heat treatment was performed at 350° C., and a positive electrode active material having a coating layer formed on the surface thereof was used.

Comparative Example 1

Nickel sulfate, cobalt sulfate, manganese sulfate, and aluminum nitrate were mixed in distilled water in amounts such that a molar ratio of nickel:cobalt:manganese:aluminum was 86:10:2:2 to prepare a transition metal-containing solution with a concentration of 2M. A positive electrode and a lithium secondary battery including the same were prepared in the same manner as in Example 1 except that a positive electrode active material represented by Li$_{1.07}$Ni$_{0.86}$Co$_{0.10}$Mn$_{0.02}$Al$_{0.02}$O$_2$ was prepared by using the above-prepared transition metal-containing solution.

Comparative Example 2

Nickel sulfate, cobalt sulfate, manganese sulfate, and aluminum nitrate were mixed in distilled water in amounts such that a molar ratio of nickel:cobalt:manganese:aluminum was 90:2:5:3 to prepare a solution with a concentration of 2M as a first transition metal-containing solution.

Nickel sulfate, cobalt sulfate, manganese sulfate, and aluminum nitrate were mixed in distilled water in amounts such that a molar ratio of nickel:cobalt:manganese:aluminum was 65:5:25:5 to prepare a solution with a concentration of 2M as a second transition metal-containing solution.

A positive electrode active material, and a positive electrode and a lithium secondary battery, which include the positive electrode active material, were prepared in the same manner as in Example 1 except that the above-described first transition metal-containing solution and the second transition metal-containing solution were used to prepare precursor particles, in which an average composition of a center portion of the particle was Ni$_{0.90}$Co$_{0.02}$Mn$_{0.05}$Al$_{0.03}$(OH)$_2$, and an average composition of a surface portion was Ni$_{0.65}$Co$_{0.05}$Mn$_{0.25}$Al$_{0.05}$(OH)$_2$, and the positive electrode active material with a total average composition of a positive electrode active material particle of LiNi$_{0.84}$Co$_{0.03}$Mn$_{0.10}$Al$_{0.03}$O$_2$.

Experimental Example 1: Measurement of Amount of Lithium by-Products on Surface of Positive Electrode Active Material A pH titration was performed by using a pH metrohm Titrino, as a pH meter, to measure an amount of lithium by-products on each surface of the positive electrode active materials prepared in Examples 1 to 3 and Comparative Examples 1 and 2. Specifically, after 10 g of each positive electrode active material powder and 100 mL of distilled water were stirred, the pH titration was performed while 0.1 N HCl solution was added to the solution. A total amount of the lithium by-products of each positive electrode active material was calculated by the amount of HCl titrated and the results thereof are presented in Table 1 below.

TABLE 1

| | Total amount of lithium by-products (wt %) |
|---|---|
| Example 1 | 0.49 |
| Example 2 | 0.43 |
| Example 3 | 0.38 |
| Comparative Example 1 | 0.51 |
| Comparative Example 2 | 0.94 |

Referring to Table 1, it may be confirmed that the amount of lithium by-products present on each surface of the positive electrode active materials prepared in Examples 1 to 3 was less than 0.5 wt %. In contrast, an amount of lithium by-products of each of the positive electrode active materials prepared in Comparative Examples 1 and 2 was greater than 0.5 wt %, and, particularly, in a case in which a molar ratio of Ni/Co and/or a molar ratio of Ni/Mn of the center portion and the surface portion of the positive electrode active material were outside the ranges of the present invention as in Comparative Example 2, it may be confirmed that the amount of lithium by-products was particularly increased.

Experimental Example 2: Charge and Discharge Efficiency

The coin-type batteries respectively prepared in Examples 1 to 3 and Comparative Examples 1 and 2 were charged at 4.25 V at 0.1 C to 0.005 C in a constant current (CC)-constant voltage (CV) charge mode at 25° C., and discharged at 0.1 C to 2.5 V to measure a primary efficiency, and, after the coin-type batteries were charged at 4.25 V at 0.1 C to 0.005 C in a CC-CV charge mode at 25° C. and discharged at a CC of 0.1 C to 2.5 V, the coin-type batteries were discharged at a CV for 5 hours to measure a secondary efficiency. The results thereof are presented in Table 2 below.

TABLE 2

| | Primary efficiency (%) | Secondary efficiency (%) |
|---|---|---|
| Example 1 | 93.8 | 98.7 |
| Example 2 | 92.4 | 98.1 |
| Example 3 | 94.6 | 99.2 |
| Comparative Example 1 | 89.1 | 94.7 |
| Comparative Example 2 | 82.1 | 90.6 |

As illustrated in Table 2, the coin-type batteries prepared in Examples 1 to 3 each exhibited a primary efficiency of 92% or more, but the coin-type batteries prepared in Comparative Examples 1 and 2 each exhibited a primary efficiency of less than 90%. Also, it may be confirmed that the coin-type batteries prepared in Examples 1 to 3 each exhibited a secondary efficiency of 98% or more, but the coin-type batteries prepared in Comparative Examples 1 and 2 each exhibited a secondary efficiency of less than 95%.

Thus, it may be confirmed that, with respect to the coin-type batteries prepared in Examples 1 to 3, both efficiencies according to each discharge condition were better than those of the coin-type batteries prepared in Comparative Examples 1 and 2.

Experimental Example 3: Life Characteristics

The coin-type batteries respectively prepared in Examples 1 to 3 and Comparative Examples 1 and 2 were charged a rate of 0.5 C to 4.25 V in a thermostat at 45° C., and then discharged at a rate of 0.5 C to 3.0 V. After this cycle was repeated 50 times, capacity after 50 charge and discharge cycles relative to initial capacity was defined as life characteristics, and the results thereof are presented in Table 3 below.

TABLE 3

| | Life characteristics after 50 charge and discharge cycles at 45° C. (%) |
|---|---|
| Example 1 | 94.5 |
| Example 2 | 93.4 |
| Example 3 | 95.7 |
| Comparative Example 1 | 92.1 |
| Comparative Example 2 | 88.8 |

As illustrated in Table 3, it may be confirmed that the coin-type batteries prepared in Examples 1 to 3 each exhibited life characteristics after 50 charge and discharge cycles at high temperature of 93% or more. In contrast, with respect to the coin-type batteries prepared in Comparative Examples 1 and 2, life characteristics after charging and discharging under the same conditions were 92.1% and 88.8%, respectively, wherein it may be confirmed that the life characteristics were inferior to those of the coin-type batteries prepared in Examples 1 to 3.

The invention claimed is:

1. A positive electrode active material comprising:
   a center portion including a first lithium transition metal oxide with an average composition represented by Formula 1; and
   a surface portion including a second lithium transition metal oxide with an average composition represented by Formula 2:

$$Li_{1+a1}(Ni_{b1}Co_{c1}Mn_{d1}Al_{e1}M^1_{f1})O_2 \quad \text{[Formula 1]}$$

wherein in Formula 1, $-0.1 \leq a1 \leq 0.2$, $0.8 \leq b1 < 1.0$, $0 < c1 \leq 0.2$, $0 < d1 \leq 0.1$, $0 < e1 \leq 0.05$, $0 \leq f1 \leq 0.05$, $b1/c1 \leq 25$, and $b1/d1 \geq 20$, and $M^1$ comprises at least one selected from the group consisting of magnesium (Mg), titanium (Ti), zirconium (Zr), niobium (Nb), and tungsten (W), and $$Li_{1+a2}(Ni_{b2}Co_{c2}Mn_{d2}Al_{e2}M^1_{f2})O_2 \quad \text{[Formula 2]}$$

wherein, in Formula 2, $-0.1 \leq a2 \leq 0.2$, $0.6 \leq b2 \leq 0.95$, $0 < c2 \leq 0.2$, $0 < d2 \leq 0.1$, $0 < e2 \leq 0.05$, $0 \leq f2 \leq 0.05$, $b2/c2 < 13$, and $b2/d2 \leq 3$, and $M^1$ comprises at least one selected from the group consisting of Mg, Ti, Zr, Nb, and W.

2. The positive electrode active material of claim 1, wherein the positive electrode active material has the center portion, a region corresponding to 50 vol % to 95 vol % of a total volume of a particle from a center of the particle, and the surface portion located on an outer surface of the center portion.

3. The positive electrode active material of claim 1, further comprising a concentration gradient structure in which a concentration of at least one metallic element included in the positive electrode active material is gradually changed from a center of a particle to a surface of the particle.

4. The positive electrode active material of claim 1, further comprising a coating layer which is formed on a surface of the positive electrode active material and comprises at least one selected from the group consisting of boron, silicon, tungsten, and niobium.

5. The positive electrode active material of claim 1, wherein an amount of lithium by-products present on a surface of the positive electrode active material is in a range of 0.2 part by weight to 0.8 part by weight based on 100 parts by weight of the positive electrode active material.

6. The positive electrode active material of claim 1, wherein an amount of nickel is 60 mol % or more based on a total number of moles of transition metals excluding lithium.

7. The positive electrode active material of claim 1, wherein a Ni/Co ratio is 5 to 15 throughout the positive electrode active material.

8. The positive electrode active material of claim 1, wherein a Ni/Mn ratio is 15 to 60 throughout the positive electrode active material.

9. The positive electrode active material of claim 1, wherein a Ni/Co ratio of the center portion is 5 to 20.

10. The positive electrode active material of claim 1, wherein a Ni/Mn ratio of the center portion is 30 to 60.

11. Three positive electrode active material of claim 1, wherein a Ni/Co ratio of the surface portion is 5 or less.

12. The e-positive electrode active material of claim 1, wherein a Ni/Co ratio of the surface portion is 30 to 50.

13. A positive electrode for a secondary battery, the positive electrode comprising:
a positive electrode collector; and
a positive electrode active material layer formed on the positive electrode collector, wherein the positive electrode active material layer comprises the positive electrode active material of claim 1.

14. A lithium secondary battery comprising the positive electrode of claim 13; a negative electrode; a separator disposed between the positive electrode and the negative electrode; and an electrolyte,
wherein a charge and discharge efficiency is 90% or more when the lithium secondary battery is charged at 4.25 V at 0.1 C to 0.005 C in a constant current (CC)-constant voltage (CV) charge mode at 25° C., and discharged at 0.1 C to 2.5 V, and
the charge and discharge efficiency is 95% or more when the lithium secondary battery is discharged at a CV for 5 hours after the lithium secondary battery is charged at 4.25 V at 0.1 C to 0.005 C in a CC-CV charge mode at 25° C., and discharged at a CC of 0.1 C to 2.5 V.

15. A method of preparing a positive electrode active material, comprising:
preparing a positive electrode active material precursor which includes nickel, cobalt, manganese, and aluminum, but has different compositions of a center portion and a surface portion; and
mixing the positive electrode active material precursor and a lithium source and sintering the mixture to form a lithium transition metal oxide,
wherein the lithium transition metal oxide comprises a center portion with an average composition represented by Formula 1, and a surface portion with an average composition represented by Formula 2:

$$Li_{1+a1}(Ni_{b1}Co_{c1}Mn_{d1}Al_{e1}M^1_{f1})O_2 \quad \text{[Formula 1]}$$

wherein in Formula 1, $-0.1 \leq a1 \leq 0.2$, $0.8 \leq b1 < 1.0$, $0 < c1 \leq 0.2$, $0 < d1 \leq 0.1$, $0 < e1 \leq 0.05$, $0 \leq f1 \leq 0.05$, $b1/c1 \leq 25$, and $b1/d1 \geq 20$, and $M^1$ comprises at least one selected from the group consisting of magnesium (Mg), titanium (Ti), zirconium (Zr), niobium (Nb), and tungsten (W), and $$Li_{1+a2}(Ni_{b2}Co_{c2}Mn_{d2}Al_{e2}M^1_{f2})O_2 \quad \text{[Formula 2]}$$

wherein, in Formula 2, $-0.1 \leq a2 \leq 0.2$, $0.6 \leq b2 \leq 0.95$, $0 < c2 \leq 0.2$, $0 < d2 \leq 0.1$, $0 < e2 \leq 0.05$, $0 \leq f2 \leq 0.05$, $b2/c2 < 13$, and $b2/d2 \leq 3$, and $M^1$ comprises at least one selected from the group consisting of Mg, Ti, Zr, Nb, and W.

16. The method of claim 15, further comprising, after washing the lithium transition metal oxide with a solution with a pH of 9 to 11 at a temperature of −10° C. to 15° C., drying the washed lithium transition metal oxide in an inert atmosphere, and performing a heat treatment in an oxygen atmosphere at 500° C. to 750° C.

17. The method of claim 15, wherein the positive electrode active material precursor has a center portion with an average composition represented by Formula 3, and a surface portion with an average composition represented by Formula 4:

$$Ni_{b3}Co_{c3}Mn_{d3}Al_{e3}M^1_{f3}(OH_2) \quad \text{[Formula 3]}$$

wherein, in Formula 3, $0.8 \leq b3 < 1.0$, $0 \leq c3 \leq 0.2$, $0 \leq d3 \leq 0.1$, $0 \leq e3 \leq 0.05$, and $0 < f3 < 0.05$, and $M^1$ is at least one selected from the group consisting of Mg, Ti, Zr, Nb, and W and, $$Ni_{b4}CO_{c4}Mn_{d4}Al_{e4}M^1_{f4}(OH_2) \quad \text{[Formula 4]}$$

wherein, in Formula 4, $0.6 \leq b4 \leq 0.95$, $0 \leq c4 \leq 0.2$, $0 \leq d4 \leq 0.1$, $0 \leq e4 \leq 0.05$, and $0 \leq f4 \leq 0.05$, and $M^1$ is at least one selected from the group consisting of Mg, Ti, Zr, Nb, and W.

* * * * *